(12) United States Patent
Takei et al.

(10) Patent No.: US 12,116,509 B2
(45) Date of Patent: Oct. 15, 2024

(54) HOT-MELT ADHESIVE RESIN COMPOSITION AND HOT-MELT ADHESIVE RESIN LAMINATE

(71) Applicant: FUJIMORI KOGYO CO., LTD., Tokyo (JP)

(72) Inventors: Kunihiro Takei, Tokyo (JP); Hirokazu Iizuka, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 890 days.

(21) Appl. No.: 17/274,884

(22) PCT Filed: Sep. 10, 2019

(86) PCT No.: PCT/IB2019/057600
§ 371 (c)(1),
(2) Date: Mar. 10, 2021

(87) PCT Pub. No.: WO2020/053746
PCT Pub. Date: Mar. 19, 2020

(65) Prior Publication Data
US 2022/0049131 A1 Feb. 17, 2022

(30) Foreign Application Priority Data
Sep. 13, 2018 (JP) ................. 2018-171482

(51) Int. Cl.
*C09J 7/35* (2018.01)
*C09J 7/24* (2018.01)
(Continued)

(52) U.S. Cl.
CPC ................ *C09J 7/35* (2018.01); *C09J 7/243* (2018.01); *C09J 7/255* (2018.01); *C09J 123/26* (2013.01);
(Continued)

(58) Field of Classification Search
CPC ..... C09J 7/35; C09J 7/243; C09J 7/255; C09J 2301/122; C09J 2301/302; C09J 2423/006;
(Continued)

(56) References Cited

U.S. PATENT DOCUMENTS 9,359,534 B2   6/2016   Urbach et al.
9,825,264 B2   11/2017  Nakazato et al.
(Continued)

FOREIGN PATENT DOCUMENTS

CN   102482544 A   5/2012
CN   105315934 A   2/2016
(Continued)

OTHER PUBLICATIONS

Extended European Search Report in corresponding European Patent Application No. 19859527.4 dated Aug. 16, 2021, 5 pgs.
(Continued)

*Primary Examiner* — Scott R. Walshon
(74) *Attorney, Agent, or Firm* — Hauptman Ham LLP

(57) ABSTRACT

A hot-melt adhesive resin composition includes a modified polyolefin in which a functional group is introduced into a polyolefin, a solid phenol resin, and a crosslinking agent, wherein the content of the modified polyolefin is 10 parts by mass or more and 40 parts by mass or less, based on 100 parts by mass of the total of the modified polyolefin and the solid phenol resin, and the modified polyolefin and the crosslinking agent are mixed so that a functional group possessed by the crosslinking agent is more than 1.0 equivalent and 5.0 equivalents or less, based on 1.0 equivalent of a functional group possessed by the modified polyolefin.

6 Claims, 2 Drawing Sheets

(51) Int. Cl.
*C09J 7/25* (2018.01)
*C09J 123/26* (2006.01)

(52) U.S. Cl.
CPC .... *C09J 2301/122* (2020.08); *C09J 2301/304* (2020.08); *C09J 2423/006* (2013.01); *C09J 2423/10* (2013.01); *C09J 2423/106* (2013.01); *C09J 2461/00* (2013.01); *C09J 2467/006* (2013.01); *C09J 2479/086* (2013.01)

(58) Field of Classification Search
CPC .............. C09J 2461/00; C09J 2467/006; C09J 2479/086; C09J 123/26; C09J 11/06; C09J 2301/304
See application file for complete search history.

(56) References Cited

U.S. PATENT DOCUMENTS

| | | | |
|---|---|---|---|
| 10,903,524 | B2 | 1/2021 | Iizuka et al. |
| 11,242,474 | B2 | 2/2022 | Takeda et al. |
| 2012/0171466 | A1 | 7/2012 | Urbach et al. |
| 2013/0310509 | A1 | 11/2013 | Hannemann et al. |
| 2018/0019502 | A1 | 1/2018 | Iizuka et al. |
| 2019/0001634 | A1* | 1/2019 | Takei ............ B32B 27/325 |
| 2019/0001635 | A1* | 1/2019 | Takei ............ C09J 151/06 |
| 2019/0218430 | A1* | 7/2019 | Nishijima ......... H01L 31/048 |
| 2020/0230854 | A1* | 7/2020 | Agag .............. B32B 7/12 |

FOREIGN PATENT DOCUMENTS

| | | | |
|---|---|---|---|
| CN | 107618232 | A | 1/2018 |
| CN | 108359399 | A | 8/2018 |
| JP | S62-041549 | B2 | 9/1987 |
| JP | H2-067386 | A | 3/1990 |
| JP | 3991268 | B2 | 10/2007 |
| JP | 2011057804 | A | 3/2011 |
| JP | 2013503225 | A | 1/2013 |
| JP | 2016125042 | A | 7/2016 |
| JP | 2018008497 | A | 1/2018 |
| JP | 2018-131566 | A | 8/2018 |

OTHER PUBLICATIONS

International Search Report dated Oct. 21, 2019 for PCT/IB2019/057600 and English translation thereof; 6 pgs.
Written Opinion of the International Searching Authority dated Oct. 21, 2019 for PCT/IB2019/057600 and English translation thereof; 8 pgs.
Notice of Allowance for Chinese Patent Application No. 201980058907.4 dated Jun. 10, 2022, and English translation thereof; 7 pgs.
Notice of Allowance for Japanese Patent Application No. 2018-171482 dated Jul. 26, 2022, and English translation thereof; 5 pgs.
Office Action for Korean Patent Application No. 10-2021-7007186 dated May 20, 2022, and English translation thereof; 5pgs.
Notice of Allowance in Corresponding Korean Patent Application No. 10-2021-7007186, dated Sep. 28, 2022; 3 pgs.
Notice of Allowance in Corresponding Japanese Patent Application No. 2022-134123, dated Jun. 13, 2023; 5 pgs.
Office Action in Corresponding European Patent Application No. 19859527.4, dated May 3, 2024; 4 pgs.

* cited by examiner

HOT-MELT ADHESIVE RESIN COMPOSITION AND HOT-MELT ADHESIVE RESIN LAMINATE

CROSS REFERENCE TO RELATED APPLICATIONS

This Application is a national phase of PCT/IB2019/057600 filed on Sep. 10, 2019, which, in turn, claimed the priority of Japanese Patent Application No. 2018-171482 which was filed on Sep. 13, 2018.

TECHNICAL FIELD

The present invention relates to a hot-melt adhesive resin composition and a hot-melt adhesive resin laminate.

BACKGROUND TECHNOLOGY

Conventionally, as a material that adheres to an adherend such as metal, a hot-melt adhesive agent has been used. In Patent Document 1, there is described a film-like adhesive agent for connecting circuit members, which comprises a thermoplastic resin, an epoxy resin, a phenol resin, and an insulating spherical inorganic filler.

DOCUMENTS OF RELATED ART

Patent Document

Patent Document 1: Japanese Patent No. 3991268

SUMMARY OF THE INVENTION

Problem to be Solved by the Invention

In order to proceed with a crosslinking reaction, the conventional hot-melt adhesive agent may require a long heating step or a light energy irradiating step. In addition, in cases where a hot-melt adhesive agent and the moisture are contacted to perform crosslinking, special crosslinking equipment may be required.

Meanwhile, in order to proceed with a crosslinking reaction in a short time, a hot-melt adhesive agent having high reactivity is required. In such a case, in order to store the hot-melt adhesive agent, it has been necessary to set special storage conditions such as low temperature storage, damp-proof storage, and light shielding storage.

Under such situations, there is desired a hot-melt adhesive agent that makes a crosslinking reaction proceed in a short time, and is easy to store.

The present invention has been made in view of the above-mentioned various circumstances, and an object of the present invention is to provide a hot-melt adhesive resin composition that adheres by heating in a short time, can exert a high adhesive force, and is easy to store.

Means for Solving the Problem

The present invention adopts the following configuration:
[1] A hot-melt adhesive resin composition comprising a modified polyolefin (A) in which a functional group is introduced into a polyolefin, a solid phenol resin (B), and a crosslinking agent (C), wherein the content of the modified polyolefin (A) is 10 parts by mass or more and 40 parts by mass or less, based on 100 parts by mass of the total of the modified polyolefin (A) and the solid phenol resin (B), and the modified polyolefin (A) and the crosslinking agent (C) are mixed so that a functional group possessed by the crosslinking agent (C) is more than 1.0 equivalent and 5.0 equivalents or less, based on 1.0 equivalent of a functional group possessed by the modified polyolefin (A).
[2] The hot-melt adhesive resin composition according to [1], wherein the modified polyolefin (A) is a modified polyolefin modified with a carboxylic acid or a carboxylic anhydride.
[3] The hot-melt adhesive resin composition according to [1] or [2], wherein the solid phenol resin (B) is a thermally melting type phenol resin.
[4] The hot-melt adhesive resin composition according to any one of [1] to [3], wherein the crosslinking agent (C) is one or more selected from the group consisting of an epoxy resin, a phenoxy resin, an isocyanate resin, an oxazoline group-containing resin, an amino group-containing resin, a polyamine, an amide resin, a melamine resin, and a urea resin.
[5] A hot-melt adhesive resin laminate having a substrate layer comprising resin as a material for forming the substrate layer, and an adhesive layer, wherein the hot-melt adhesive resin laminate comprises the adhesive layer on at least one side of the substrate layer, and the adhesive layer is formed of the hot-melt adhesive resin composition according to any one of [1] to [4].
[6] The hot-melt adhesive resin laminate according to [5], wherein the substrate layer comprises, as the material for forming the substrate layer, one or more resins selected from the group consisting of a fluorine resin, a polyimide resin, a polyether ether ketone resin, a polyphenylene sulfide resin, a polyphenylene ether resin, a liquid crystal polyester resin, a polyester resin, a polyamide resin, a polyamideimide resin, an epoxy resin, an acrylic resin, a polyketone resin, a cyclic olefin resin, polymethylpentene, polypropylene, and polyethylene.

Effects of Invention

According to the present invention, a hot-melt adhesive resin composition can be provided which adheres by heating in a short time, can exert a high adhesive force, and is easy to store.

Herein, "heating in a short time" means heating at a heating temperature of 100° C. to 200° C. for 5 minutes to 15 minutes.

BEST MODE FOR CARRYING OUT THE INVENTION

Figure 1:
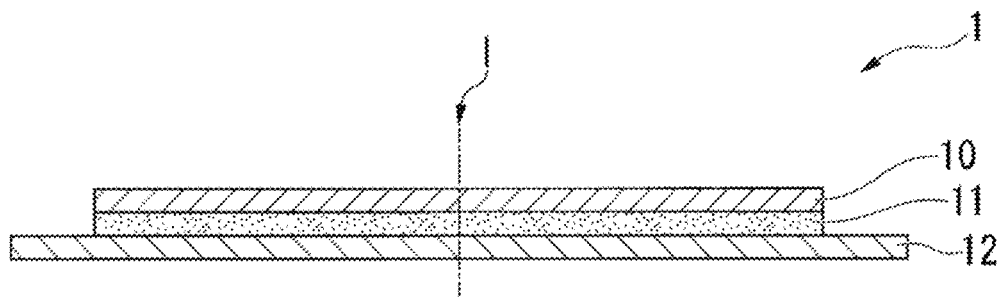
FIG. 1 is a schematic view of a cross section of a test laminate in which a hot-melt adhesive resin laminate of the present embodiment is laminated on a metal plate.

The present invention will be illustrated below, based on preferable embodiments.

Hot-Melt Adhesive Resin Composition

The hot-melt adhesive resin composition of the present embodiment comprises a modified polyolefin (A) in which a functional group is introduced into a polyolefin (hereinafter, may be referred to as "modified polyolefin (A)" or "(A) component"), a solid phenol resin (B) (hereinafter, may be referred to as "(B) component"), and a crosslinking agent (C) (hereinafter, may be referred to as "(C) component").

In the present embodiment, the content of the modified polyolefin (A) is 10 parts by mass or more and 40 parts by mass or less, based on 100 parts by mass of the total of the modified polyolefin (A) and the solid phenol resin (B).

Furthermore, the modified polyolefin (A) and the crosslinking agent (C) are mixed so that a functional group possessed by the crosslinking agent (C) is more than 1.0 equivalent and 5.0 equivalents or less, based on 1.0 equivalent of a functional group possessed by the modified polyolefin (A).

Each component contained in the hot-melt adhesive resin composition of the present embodiment will be illustrated below.

Modified Polyolefin (A)

The modified polyolefin (A) is a modified polyolefin in which a functional group is introduced into a polyolefin. Herein, "functional group" is a functional group that interacts with the surface of an adherend, and in the present embodiment, it is preferably an acidic functional group such as a carboxy group and a carboxylic anhydride group. The modified polyolefin (A) is a component that contributes to the adhesiveness. Herein, "interacts with the surface of an adherend" means that a chemical bond such as a hydrogen bond is formed between a polar group on the adherend surface and an acidic functional group possessed by the modified polyolefin (A).

In the present embodiment, the modified polyolefin (A) is a polyolefin resin modified with a carboxylic acid or an anhydride thereof, and one having an acid functional group such as a carboxy group and a carboxylic anhydride group in a polyolefin resin is preferable.

The modified polyolefin (A) can be prepared by introducing a functional group into a polyolefin. Examples of an introducing method include a copolymerization method or an acid-modifying method.

Examples of the copolymerization method include a method of copolymerizing an acid functional group-containing monomer and olefins.

Examples of the acid-modifying method include graft modification in which a polyolefin resin and an acid functional group-containing monomer are melted and kneaded in the presence of a radial polymerization initiator such as an organic peroxide and an aliphatic azo compound.

In the present embodiment, it is preferable to acid-modify a polyolefin resin to prepare a modified polyolefin (A).

Examples of the above-mentioned polyolefin-based resin include polyethylene, polypropylene, poly-1-butene, polyisobutylene, a copolymer of propylene and ethylene, a copolymer of propylene and an olefin-based monomer, and the like.

Examples of the olefin-based monomer when copolymerization is performed include 1-butene, isobutylene, 1-hexene, and the like.

Inter alia, as the modified polyolefin (A), maleic anhydride-modified polypropylene is preferable from a view of the adhesiveness, the durability, and the like.

Weight Average Molecular Weight

In the present embodiment, a weight average molecular weight of the modified polyolefin (A) is preferably 40,000 or more, more preferably 50,000 or more, particularly preferably 60,000 or more. Moreover, 140,000 or less is preferable, 130,000 or less is more preferable, and 120,000 or less is particularly preferable. The above-mentioned upper limit values and lower limit values can be arbitrarily combined.

Acid Addition Amount

Examples of the carboxylic acid that is used for modification include, for example, acrylic acid, methacrylic acid, maleic acid, nadic acid, fumaric acid, itaconic acid, crotonic acid, citraconic acid, sorbic acid, mesaconic acid, angelic acid, and the like. In addition, examples of a derivative thereof include an acid anhydride, an ester, an amide, an imide, a metal salt, and the like, and include specifically, for example, maleic anhydride, itaconic anhydride, citraconic anhydride, naclic anhydride, methyl acrylate, methyl methacrylate, ethyl acrylate, butyl acrylate, maleic acid monoethyl ester, acrylamide, maleic acid monoamide, maleimide, N-butylmaleimide, sodium acrylate, sodium methacrylate, and the like. Among them, an unsaturated dicarboxylic acid and a derivative thereof are preferable, and particularly, maleic anhydride or phthalic anhydride is preferable.

In the present embodiment, it is preferable that a carboxylic acid addition amount of the modified polyolefin (A) is 0.5% by mass or more and 3.0% by mass or less.

Melting Point

In the present embodiment, a melting point of the modified polyolefin (A) is preferably 50° C. or higher, more preferably 55° C. or higher, particularly preferably 60° C. or higher. In addition, an upper limit value of a melting point is preferably 110° C. or lower, more preferably 105° C. or lower, particularly preferably 100° C. or lower. The above-mentioned upper limit values and lower limit values can be arbitrarily combined. In the present embodiment, 50° C. or higher and 100° C. or lower is more preferable.

Solid Phenol Resin (B)

The solid phenol resin (B) is preferably a thermally melting type phenol resin. Specifically, examples thereof include a novolak type phenol resin (hydroxyl equivalent: 100 g/eq to 110 g/eq, softening point: 75° C. to 125° C.), a cresol type phenol resin (hydroxyl equivalent: 110 g/eq to 120 g/eq, softening point: 80° C. to 130° C.), or a mixture of these. Examples of such a solid phenol resin (B) include Bellpearl S type manufactured by Air Water Bellpearl Inc. By using such a solid phenol resin (B), a rigid structure can be imparted to an adhesive layer after curing, and for example, even when placed under the high temperature environment at around 180° C., an adhesive force is maintained.

A weight average molecular weight of the solid phenol resin (B) is preferably 1,000 or more, more preferably 2,000 or more, particularly preferably 3,000 or more. In addition, 10,000 or less is preferable, 9,000 or less is more preferable, and 8,000 or less is particularly preferable. The above-mentioned upper limit values and lower limit values can be arbitrarily combined.

When a weight average molecular weight of the solid phenol resin (B) is in the above-mentioned range, moisture resistance can be imparted to the hot-melt adhesive resin composition.

A softening point of the solid phenol resin (B) is preferably 50° C. or higher, more preferably 55° C. or higher, particularly preferably 60° C. or higher. In addition, an upper limit value of a softening point is preferably 160° C. or lower, more preferably 150° C. or lower, particularly preferably 140° C. or lower. The above-mentioned upper limit values and lower limit values can be arbitrarily combined.

When a softening point of the solid phenol resin (B) is in the above-mentioned range, a reaction with the crosslinking agent (C) does not progress excessively, and the storage property becomes good.

Herein, "storage property" means the property that storage for a few months is possible at a temperature of around 25° C. to 40° C. without the need of light shielding equipment or dampproof equipment.

In the present embodiment, the content of the modified polyolefin (A) is preferably 10 parts by mass or more and 40 parts by mass or less, more preferably 15 parts by mass or more and 35 parts by mass or less, based on 100 parts by mass of the total of the modified polyolefin (A) and the solid phenol resin (B).

When the content of the modified polyolefin (A) is equal to or more than the above-mentioned lower limit value, an adhesive force can be enhanced. When the content of the modified polyolefin (A) is equal to or less than the above-mentioned upper limit value, for example, even when placed under the high temperature environment at around 180° C., an adhesive force is maintained.

In the present embodiment, the content of the solid phenol resin (B) is preferably 60 parts by mass or more and 90 parts by mass or less, more preferably 65 parts by mass or more and 85 parts by mass or less, based on 100 parts by mass of the total of the modified polyolefin (A) and the solid phenol resin (B).

When the content of the solid phenol resin (B) is equal to or more than the above-mentioned lower limit value, for example, even when placed under the high temperature environment at around 180° C., an adhesive force is maintained. When the content of the solid phenol resin (B) is equal to or less than the above-mentioned upper limit value, an adhesive force can be enhanced.

Crosslinking Agent (C)

It is preferable that the crosslinking agent (C) is one or more selected from the group consisting of an epoxy resin, a phenoxy resin, an isocyanate resin, an oxazoline group-containing resin, an amino group-containing resin, a polyamine, an amide resin, a melamine resin, and a urea resin. Among them, an epoxy resin or an isocyanate resin is preferable.

Examples of the epoxy resin include a bisphenol A type epoxy resin, a bisphenol F type epoxy resin, a novolak type epoxy resin, a glycidylamine type epoxy resin, and the like.

Examples of the isocyanate resin include a biuret-modified product or an isocyanurate-modified product of diisocyanates such as hexamethylene diisocyanate, isophorone cliisocyanate, diphenylmethane cliisocyanate, tolylene diisocyanate, and xylylene diisocyanate, polyisocyanate compounds such as an adduct product with a tri- or higher polyol such as trimethylolpropane and glycerin, and the like.

In the present embodiment, it is preferable that the modified polyolefin (A) and the crosslinking agent (C) are mixed so that a functional group possessed by the crosslinking agent (C) is more than 1.0 equivalent and 5.0 equivalents or less, based on 1.0 equivalent of a functional group possessed by the modified polyolefin (A).

Herein, the functional group possessed by the modified polyolefin (A) is an acidic functional group such as a carboxy group and a carboxylic anhydride group.

In addition, the functional group possessed by the crosslinking agent (C) is an epoxy group when the above-mentioned crosslinking agent (C) is an epoxy resin, is a hydroxy group when it is a phenoxy resin, is an isocyanate group when it is an isocyanate resin, is an oxazoline group when it is an oxazoline group-containing resin, is an amino group when it is an amino group-containing resin, is an amine when it is a polyamine, is an amide group when it is an amide resin, is an amide group when it is a melamine resin, and is an amino group when it is a urea resin.

In order to determine an mixing amount of the crosslinking agent (C) to the modified polyolefin (A), first, regarding the modified polyolefin (A) and the crosslinking agent (C), the concentration of a functional group is obtained by a potentiometric titration method or an indicator titration method. One example when the concentration (acid value (—COOH) or hydroxyl value (—OH)) of a functional group of the modified polyolefin (A) is calculated by an indicator titration method will be shown below.

Method of Measuring Acid Value

1) About 3 g of a sample is weighed out, and placed into a 200 mL tall beaker.
2) 20 mL of a titration solvent is added thereto.
3) Liquid is heated to 20° C. with a beaker heating device to dissolve the sample.
4) After a liquid temperature has become constant at 20° C., titration is performed using a 0.1 mol/L potassium hydroxide-ethanol solution, and an acid value is obtained.

Calculation of Acid Value $$\text{Acid value(mg/g)} = (EP1 - BL1) \times FA1 \times C1 \times K1 / \text{SIZE}$$

In the above-mentioned equation, each abbreviation indicates the following numerical value.
EP1: Titration amount (mL)
BL1: Blank value (0.0 mL)
FA1: Factor of titration liquid (1.00)
C1: Concentration conversion value (5.611 mg/mL)
(Potassium hydroxide equivalent of 0.1 mol/L KOH 1 mL)
K1: Coefficient (1)
SIZE: Sampling amount (g)

Using the concentration of the functional group obtained by the above-mentioned method, it is mixed so that a functional group possessed by the crosslinking agent (C) is more than 1.0 equivalent and 5.0 equivalents or less, based on 1.0 equivalent of a functional group possessed by the modified polyolefin (A).

From an acid value of the modified polyolefin (A), a specific mixing amount (parts by mass) of the crosslinking agent (C) is calculated by a method described below. First, a functional group equivalent of the modified polyolefin (A) is obtained by the following equation.

Functional group equivalent of modified polyolefin (A)=molecular weight of KOH×1000/acid value For example, when the functional group is epoxy, a functional group equivalent of the crosslinking agent (C) can be obtained by measurement conforming to JIS K-7236.

When the functional group is isocyanate, the equivalent is obtained by measurement conforming to JIS K-7301.

Method of Measuring Isocyanate Equivalent 1) 3 g of a sample is taken into a 200 mL Erlenmeyer flask.
2) 20 mL of dehydrated toluene is added thereto to dissolve the sample.
3) 20.0 mL of a 2 mol/L dinormalbutylamine solution is added thereto.
4) After shaking to uniform, this is allowed to stand for 20 minutes or longer.
5) 100 mL of isopropyl alcohol is added thereto.
6) Titration is performed using 1 mol/L hydrochloric acid solution, to obtain an isocyanate equivalent.

Calculation of Isocyanate Equivalent

Isocyanate equivalent=(SIZE/((BL1−EP1)×FA1))×K2

EP1: Titration amount (mL)
BL1: Blank value (39.888 mL)
FA1: Factor of titration liquid (1.00)
K2: Coefficient (1000)
SIZE: Sampling amount (g)

When an mixing amount of the modified polyolefin (A) is expressed as X, an mixing amount Y of the crosslinking agent (C) is shown by the following equation.

Y=functional group equivalent of crosslinking agent (C)×X/functional group equivalent of modified polyolefin (A)

When the crosslinking agent (C) is mixed so as to exceed the above-mentioned lower limit value, for example, even when placed under the high temperature environment at around 180° C., an adhesive force is maintained.

When the crosslinking agent (C) is mixed so as to be equal to or less than the above-mentioned upper limit value, since the modified polyolefin (A) and the crosslinking agent (C) do not react excessively with each other, the storage property becomes good.

The hot-melt adhesive resin composition of the present embodiment can achieve both of the high reactivity that it adheres by heating in a short time, and the storage property, by having the above-mentioned configuration. In addition, the hot-melt adhesive resin composition of the present embodiment has a high adhesive force, particularly, to metal, and even when placed under the high temperature environment, an adhesive force is maintained.

Additional Component

In the hot-melt adhesive resin composition of the present embodiment, as an additional component, the known additives such as an antioxidant, a surfactant, a curing accelerator, a plasticizer, a filler, a crosslinking catalyst, a processing aid, and an aging preventing agent can be appropriately mixed. These may be used alone, or may be used by combining two or more.

Method of Producing Hot-Melt Adhesive Resin Composition

The hot-melt adhesive resin composition can be produced by mixing the above-mentioned modified polyolefin (A), solid phenol resin (B), and crosslinking agent (C), as well as additional components if necessary, at once, or in an appropriate order.

Hot-Melt Adhesive Resin Laminate

The hot-melt adhesive resin laminate of the present embodiment has a substrate layer comprising resin as a material for forming the substrate layer, and an adhesive layer. The hot-melt adhesive resin laminate of the present embodiment comprises the adhesive layer on at least one side of the above-mentioned substrate layer. The adhesive layer is formed of the above-mentioned hot-melt adhesive resin composition of the present embodiment.

It is preferable that the above-mentioned substrate layer comprises, as a material for forming the substrate layer, one or more resins selected from the group consisting of a fluorine resin, a polyimide resin, a polyether ether ketone resin, a polyphenylene sulfide resin, a polyphenylene ether resin, a liquid crystal polyester resin, a polyester resin, a polyamide resin, a polyamideimide resin, an epoxy resin, an acrylic resin, a polyketone resin, a cyclic olefin resin, polymethylpentene, polypropylene, and polyethylene.

A lamination example of the hot-melt adhesive resin laminate of the present embodiment will be described below.

LAMINATION EXAMPLE 1

A laminate in which an adhesive layer and a substrate layer are laminated.

LAMINATION EXAMPLE 2

A laminate in which first adhesive layer/substrate layer/second adhesive layer are laminated in this order. Provided that both of the first adhesive layer and the second adhesive layer are formed of the hot-melt adhesive resin composition of the present embodiment.

As an adherend that is bonded using the hot-melt adhesive resin laminate of the present embodiment, various adherends such as metal, glass, and plastic can be used. Since the above-mentioned hot-melt adhesive resin laminate of the present embodiment can exert the high adhesiveness to metal, metal can be preferably used as an adherend.

As the metal, the generally known metal plate, metal planar plate or metal foil can be used.

A metal used therefor may be, for example, iron, copper, aluminum, lead, zinc, titanium, or chromium, or may be a stainless steel that is an alloy, or the like. Alternatively, a metal or a non-metal that was surface processing-treated by plating with metal or coating processing with a paint containing metal may be used as an adherend. Particularly preferable is a metal planar plate or a metal foil consisting of iron, aluminum, titanium, a stainless steel, or a surface processing-treated metal, and by using these as an adherend, the hot-melt adhesive resin laminate of the present embodiment exerts a particularly firm adhesive force.

Method of Preparing Hot-Melt Adhesive Resin Laminate

The hot-melt adhesive resin laminate can be prepared by coating a hot-melt adhesive resin composition dispersed or dissolved in water or a solvent on a substrate, and drying this.

EXAMPLES

The present invention will be further specifically illustrated below by way of Examples, but the present invention is not limited to these Examples.

Production of Hot-Melt Adhesive Resin Composition

Aqueous dispersions of hot-melt adhesive resin compositions 1 to 9 having a solid content of 50% by mass, which contain a modified polyolefin (A), a solid phenol resin (B), and a crosslinking agent (C) shown in the following Table 1, at mixing ratios shown in Table 1 were obtained. "Equivalent ratio" of the crosslinking agent (C) in the following Table 1 is a functional group equivalent possessed by the crosslinking agent (C) to 1.0 equivalent of a functional group possessed by the modified polyolefin (A). A functional group amount (acid value) of the modified polyolefin (A) was calculated by the following method.

Method of Measuring Acid Value

1) About 3 g of a sample is weighed out, and placed into a 200 mL tall beaker.
2) 20 mL of a titration solvent is added thereto.
3) Liquid is heated to 20° C. with a beaker heating device to dissolve the sample.
4) After a liquid temperature has become constant at 20° C., titration is performed using a 0.1 mol/L potassium hydroxide-ethanol solution, and an acid value is obtained.

Calculation of Acid Value $$\text{Acid value (mg/g)} = (EP1-BL1) \times FA1 \times C1 \times K1 / SIZE$$

In the above-mentioned equation, each abbreviation indicates the following numerical value.
EP1: Titration amount (mL)
BL1: Blank value (0.0 mL)
FA1: Factor of titration liquid (1.00)
C1: Concentration conversion value (5.611 mg/mL)
(Potassium hydroxide equivalent of 0.1 mol/L KOH 1 mL)
K1: Coefficient (1)
SIZE: Sampling amount (g)

TABLE 1

| | Modified polyolefin (A) | | Solid phenol resin (B) | | Crosslinking agent (C) | | C/A equivalent ratio |
|---|---|---|---|---|---|---|---|
| | Component | Mixing ratio | Component | Mixing ratio | Component | Mixing ratio | |
| Hot-melt adhesive resin composition 1 | (A)-1 | 30 | (B)-1 | 70 | (C)-1 | 18.3 | 5 |
| Hot-melt adhesive resin composition 2 | (A)-1 | 30 | (B)-1 | 70 | (C)-1 | 7.3 | 2 |
| Hot-melt adhesive resin composition 3 | (A)-1 | 30 | (B)-1 | 70 | (C)-2 | 6.7 | 5 |
| Hot-melt adhesive resin composition 4 | (A)-1 | 10 | (B)-1 | 90 | (C)-1 | 6.1 | 5 |
| Hot-melt adhesive resin composition 5 | (A)-2 | 30 | (B)-1 | 70 | (C)-1 | 55.0 | 5 |
| Hot-melt adhesive resin composition 6 | (A)-1 | 30 | (B)-1 | 70 | (C)-1 | 1.8 | 0.5 |
| Hot-melt adhesive resin composition 7 | (A)-1 | 30 | (B)-1 | 70 | (C)-1 | 25.7 | 7 |
| Hot-melt adhesive | (A)-1 | 5 | (B)-1 | 95 | (C)-1 | 3.1 | 5 |

TABLE 1-continued

| | Modified polyolefin (A) | | Solid phenol resin (B) | | Crosslinking agent (C) | | C/A equivalent ratio |
|---|---|---|---|---|---|---|---|
| | Component | Mixing ratio | Component | Mixing ratio | Component | Mixing ratio | |
| resin composition 8 | | | | | | | |
| Hot-melt adhesive resin composition 9 | (A)-1 | 50 | (B)-1 | 50 | (C)-1 | 30.6 | 5 |

In Table 1, each abbreviation indicates the following material.

TABLE 2

| | |
|---|---|
| (A)-1 | Maleic acid-modified polypropylene-1 molecular weight: 90,000, equivalent: 4.500, melting point: 90° C. |
| (A)-2 | Maleic acid-modified polypropylene-2 molecular weight: 60,000, equivalent: 1.500, melting point: 80° C. |
| (B)-1 | Thermally melting type phenol resin molecular weight: 6,500, softening point: 60° C. |
| (C)-1 | Bisphenol A type epoxy equivalent: 550 |
| (C)-2 | Isocyanate HDI-based isocyanate equivalent: 200 |

Preparing of Hot-Melt Adhesive Resin Laminate

An aqueous dispersion of each of the resulting hot-melt adhesive resin compositions 1 to 9 was coated on a substrate by hand coating, and dried at 110° C. for one minute, to prepare a hot-melt adhesive resin laminate of a bilayer of substrate layer/adhesive layer (Examples 1 to 9, Comparative Examples 1 to 4). In the substrate layer, each material shown in Table 3 was used. Hereinafter, the hot-melt adhesive resin laminate of a bilayer of substrate layer/adhesive layer may be described as a "film".

In Table 3, each abbreviation of the substrate layer indicates the following material.
PI: Polyimide
PEN: Polyethylene naphthalate
PPS: Polyphenylene sulfide
COC: Cycloolefin copolymer
PP: Polypropylene Evaluation Measurement of Peeling Strength Preparing of Test Laminate The prepared test laminate will be illustrated with reference to FIG. 1.

The test laminate 1 shown in FIG. 1 was obtained by laminating an aluminum plate 12 having a thickness of 100 μm, on an adhesive layer 11 side of a film comprising a substrate layer 10 and an adhesive layer 11, and hot pressing them.

Figure 4:
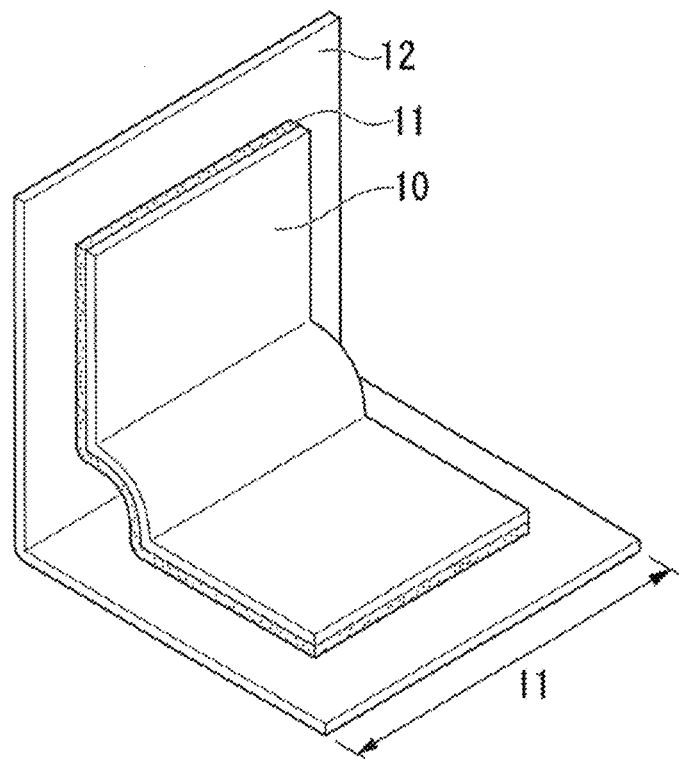
FIG. 4 is a schematic view of a cross section when a test laminate in which a hot-melt adhesive resin laminate of Comparative Example is laminated on a metal plate is bent.

The conditions for hot pressing were a temperature of 170° C., a pressure of 0.4 MPa, and a pressing time of 10 minutes. As the dimension of the test laminate 1, a width l1 shown in FIG. 4 was 20 mm, and a length was 50 mm.

Peeling Strength Test

The aluminum plate and the film of the test laminate 1 were fixed, respectively, the film was peeled at a tensile speed of 300 mm/min under the condition of a peeling angle of 180°, and an adhesive force (unit: N/15 mm) of the film to the aluminum plate was measured. Measurement was carried out under the atmosphere of a temperature of 23° C. and the humidity of 50% RH. The measured adhesive force was evaluated based on the following criteria.
○: 10 N/15 mm or more
Δ: 7 N/15 mm or more and less than 10 N/15 mm
x: Less than 7 N/15 mm Evaluation of Lift-Off at 180° C.

Figure 2:
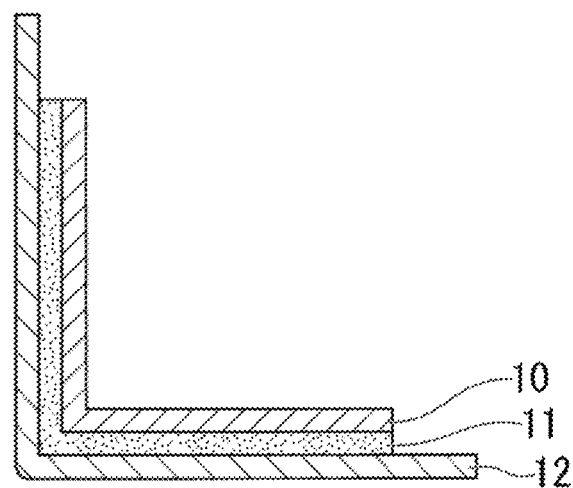
FIG. 2 is a schematic view of a cross section when a test laminate in which a hot-melt adhesive resin laminate of the present embodiment is laminated on a metal plate is bent.
Figure 3:
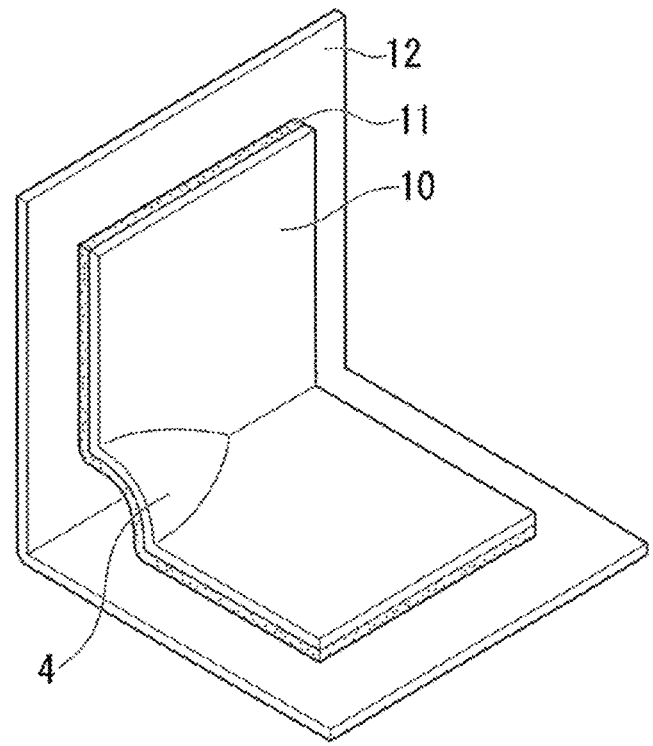
FIG. 3 is a schematic view of a cross section when a test laminate in which a hot-melt adhesive resin laminate of Comparative Example is laminated on a metal plate is bent.

The test laminate 1 shown in FIG. 1 was bent at a position of the reference numeral I so that the surface of the substrate layer 10 became inside. A bending angle was 90°. In the bent state, heating was performed at a temperature of 180° C. for 10 minutes. After heating, the adhesiveness of the film at a bent part in the bent state was evaluated based on the following criteria.
○: As in a cross section shown in FIG. 2, lift-off of the film at a bent part is not confirmed, and the adhesive layer 11 adheres to the aluminum plate 12.
Δ: As in a perspective view shown in FIG. 3, the film at a bent part is partially peeled at a place shown with the reference numeral 4, lift-off is confirmed, and the adhesive layer 11 is partially peeled on the aluminum plate 12.
x: As in a perspective view shown in FIG. 4, a whole bent part is peeled, lift-off is confirmed, and at the whole bent part, the adhesive layer 11 is completely peeled from the aluminum plate 12.

Storage Property Evaluation

The above-mentioned film was allowed to stand for 5 days under the temperature condition of 40° C. Before and after storage, by the same method as that of the above-mentioned <<Measurement of Peeling Strength>>, an adhesive force (unit: N/15 mm) of the film to the aluminum plate was measured. A ratio (%) of an adhesive force after storage to an adhesive force before storage was measured, and evaluated based on the following criteria.
○: 70% or more
Δ: 50% or more and less than 70%
x: Less than 50%

TABLE 3

| | Layer configuration | | | | Evaluation | | |
|---|---|---|---|---|---|---|---|
| | Adhesive layer | | Substrate layer | | Peeling strength | Lift-off at | Storage |
| | Hot-melt adhesive resin composition | Thickness | Material | Thickness | N/15 mm | 180° C. | property |
| Example 1 | Hot-melt adhesive resin composition 1 | 20 μm | PI | 75 μm | ○ | ○ | ○ |
| Example 2 | Hot-melt adhesive resin composition 2 | 20 μm | PI | 75 μm | ○ | ○ | ○ |
| Example 3 | Hot-melt adhesive resin composition 3 | 20 μm | PI | 75 μm | ○ | ○ | ○ |
| Example 4 | Hot-melt adhesive resin composition 4 | 20 μm | PI | 75 μm | ○ | ○ | ○ |
| Example 5 | Hot-melt adhesive resin composition 5 | 20 μm | PI | 75 μm | ○ | ○ | ○ |
| Example 6 | Hot-melt adhesive resin composition 1 | 20 μm | PEN (Corona treatment) | 75 μm | ○ | ○ | ○ |
| Example 7 | Hot-melt adhesive resin composition 1 | 20 μm | PPS (Corona treatment) | 75 μm | Δ | ○ | ○ |
| Example 8 | Hot-melt adhesive resin composition 1 | 20 μm | COC (Corona treatment) | 75 μm | Δ | ○ | ○ |
| Example 9 | Hot-melt adhesive resin composition 1 | 20 μm | PP (Corona treatment) | 75 μm | ○ | ○ | ○ |
| Comparative Example 1 | Hot-melt adhesive resin composition 6 | 20 μm | PI | 75 μm | × | Δ | ○ |
| Comparative Example 2 | Hot-melt adhesive resin composition 7 | 20 μm | PI | 75 μm | Δ | ○ | × |
| Comparative Example 3 | Hot-melt adhesive resin composition 8 | 20 μm | PI | 75 μm | Δ | × | ○ |
| Comparative Example 4 | Hot-melt adhesive resin composition 9 | 20 μm | PI | 75 μm | ○ | × | ○ |

As shown in the above-mentioned results, the hot-melt adhesive resin laminate, to which the present invention was applied, adhered by heating in a short time of 10 minutes, and exerted a high adhesive force. Furthermore, deterioration was not confirmed in an adhesive force before and after storage, without having to be stored under the special storage conditions such as low temperature storage, light shielding equipment, and dampproof equipment.

What is claimed is:

1. A hot-melt adhesive resin composition comprising a modified polyolefin (A) in which a functional group is introduced into a polyolefin (A), a solid phenol resin (B), and a crosslinking agent (C),
   wherein the content of said modified polyolefin (A) is 10 parts by mass or more and 40 parts by mass or less, based on 100 parts by mass of the total of said modified polyolefin (A) and said solid phenol resin (B), and
   said modified polyolefin (A) and said crosslinking agent (C) are mixed so that a functional group possessed by said crosslinking agent (C) is more than 1.0 equivalent and 5.0 equivalents or less, based on 1.0 equivalent of a functional group possessed by said modified polyolefin (A).

2. The hot-melt adhesive resin composition according to claim 1, wherein said modified polyolefin (A) is a modified polyolefin modified with a carboxylic acid or a carboxylic anhydride.

3. The hot-melt adhesive resin composition according to claim 1, wherein said solid phenol resin (B) is a thermally meltable phenol resin.

4. The hot-melt adhesive resin composition according to claim 1, wherein said crosslinking agent (C) is one or more selected from the group consisting of an epoxy resin, a phenoxy resin, an isocyanate resin, an oxazoline group-containing resin, an amino group-containing resin, a polyamine, an amide resin, a melamine resin, and a urea resin.

5. A hot-melt adhesive resin laminate having a substrate layer comprising resin as a material for forming said substrate layer, and an adhesive layer,
   wherein said hot-melt adhesive resin laminate comprises said adhesive layer on at least one side of said substrate layer, and
   said adhesive layer is formed of the hot-melt adhesive resin composition according to claim 1.

6. The hot-melt adhesive resin laminate according to claim 5, wherein said substrate layer comprises, as the material for forming said substrate layer, one or more resins selected from the group consisting of a fluorine resin, a polyimide resin, a polyether ether ketone resin, a polyphenylene sulfide resin, a polyphenylene ether resin, a liquid crystal polyester resin, a polyester resin, a polyamide resin, a polyamideimide resin, an epoxy resin, an acrylic resin, a polyketone resin, a cyclic olefin resin, polymethylpentene, polypropylene, and polyethylene.

\* \* \* \* \*